United States Patent [19]

Argentieri et al.

[11] Patent Number: 5,241,415
[45] Date of Patent: Aug. 31, 1993

[54] HEATED RECORDING CHAMBER

[75] Inventors: Thomas M. Argentieri, Yardley; Thomas J. Fisher, East Stroudsburg, both of Pa.

[73] Assignee: Berlex Laboratories, Inc., Cedar Knolls, N.J.

[21] Appl. No.: 836,900

[22] Filed: Feb. 19, 1992

[51] Int. Cl.[5] .................. G02B 21/30; G02B 21/34
[52] U.S. Cl. ................................ 359/395; 219/201; 435/291
[58] Field of Search .............. 359/395, 398, 391; 356/244, 246; 219/200, 201; 435/287, 291

[56] References Cited

U.S. PATENT DOCUMENTS

| | | | |
|---|---|---|---|
| 2,942,520 | 6/1960 | Rose | 359/398 |
| 3,726,597 | 4/1973 | Dvorak et al. | 359/398 |
| 4,395,492 | 7/1983 | Rees. | |
| 4,615,183 | 10/1986 | Juncos et al. | |
| 4,629,862 | 12/1986 | Kitagawa et al. | 359/395 |
| 4,707,086 | 11/1987 | Dahan et al. | 359/398 |
| 4,974,952 | 12/1990 | Focht | 359/398 |

Primary Examiner—Jon W. Henry
Attorney, Agent, or Firm—Elizabeth A. Bellamy; John R. Moses; I. William Millen

[57] ABSTRACT

A circular tissue recording chamber has a cavity therein for retaining tissue or cell samples immersed in a liquid bath. The temperature of the bath is maintained at a selected level by a transparent heater positioned beneath the bath, wherein the heater is comprised of a grid of fine wires supported on a transparent mylar substrate. Liquid is introduced into the bath through a serpentine passageway also in proximity with the heater, whereby the temperature of the liquid is raised to that of the bath as it traverses the passageway. The recording chamber has a thickness of approximately 1 cm so as to be readily usable with a high magnification microscope.

17 Claims, 2 Drawing Sheets

HEATED RECORDING CHAMBER

BACKGROUND OF THE INVENTION

The instant invention is directed to a heated recording chamber. More particularly, the instant invention is related to a heated recording chamber suitable for use with high magnification microscopes.

Electrophysiological recording from single adult cells or colonies of cultured cells requires the use of high magnification microscopes. It is necessary that tissue recording chambers used with such microscopes fit on the microscope stage and be relatively thin so that the preparation under scrutiny is relatively close to the objective of the microscope. If the cells under study are too far from the objective lens, proper focusing of the microscope is hindered, if not impossible. The tissue recording chambers must also provide for the transmission of light through the preparation containing the cells so that the cells may be observed.

When a heated recording chamber is required, it is difficult to make the chamber both transparent and relatively thin so as to be usable with high magnification microscopes. Under normal operating conditions, the chamber is superfused with a physiological solution, providing a bath which must be maintained at a selected temperature. While it is possible to preheat the physiological solution prior to delivery to the chamber, this approach is not always effective because the solution cools as it enters the chamber, resulting in a temperature gradient across the chamber. The gradient can result in opposite ends of the chamber differing in temperature by as much as 3° or 4° C. All reactions are highly temperature dependent. Therefore reactions of 3° to 4° C. preclude consistent data recordation.

In view of constraints on the configuration of recording chambers, placing a heating element under the chamber to evenly heat the entire bath is precluded because such heaters are opaque and because such heaters have a thickness which interferes with fitting the recording chamber in the space available between the objective lens of the microscope and stage.

There are a number of systems currently available for heating tissue recording chambers; however, each of these systems has at least one drawback. A heater marketed by N. B. Datynar provides a thin, optically clear heating element and temperature controller. However, the Datynar device includes no special provisions for recording chambers and is generally used as an immersion heater with a small petri dish provided by the user. Photon Technology International, Inc. makes a microscope tissue chamber which employs an annular heating element which surrounds the recording chamber. Light passes through the opening in the annular heating element, but, in order to provide for light, the opening allows cooling of the tissue chamber contents, resulting in a temperature gradient from the outer edge of the chamber to the center thereof. This system is also very expensive, even without the power supply. A number of other systems, similar to the Photon Technology International, Inc. arrangement, are available; however, these systems have the same shortcomings.

SUMMARY OF THE INVENTION

It is an object of the instant invention to provide a new and improved microscope tissue and cell chamber wherein the cell chamber provides improved thermal regulation, while providing enhanced illumination of and access to the tissue under study.

In view of the above-identified object and other objects, the instant invention contemplates a tissue recording chamber useful with microscopes, such as high magnification microscopes, wherein the tissue recording chamber comprises a base having a cavity therein for retaining tissue or at least one cell and a transparent heater in alignment with the cavity, whereby the tissue or cell may be illuminated from below.

The instant invention further contemplates the previously described tissue chamber wherein the cavity is in communication with a passageway positioned proximate the transparent heater, whereby fluid flowing through the passageway is brought to the temperature of fluid in the chamber as the fluid traverses the passageway.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
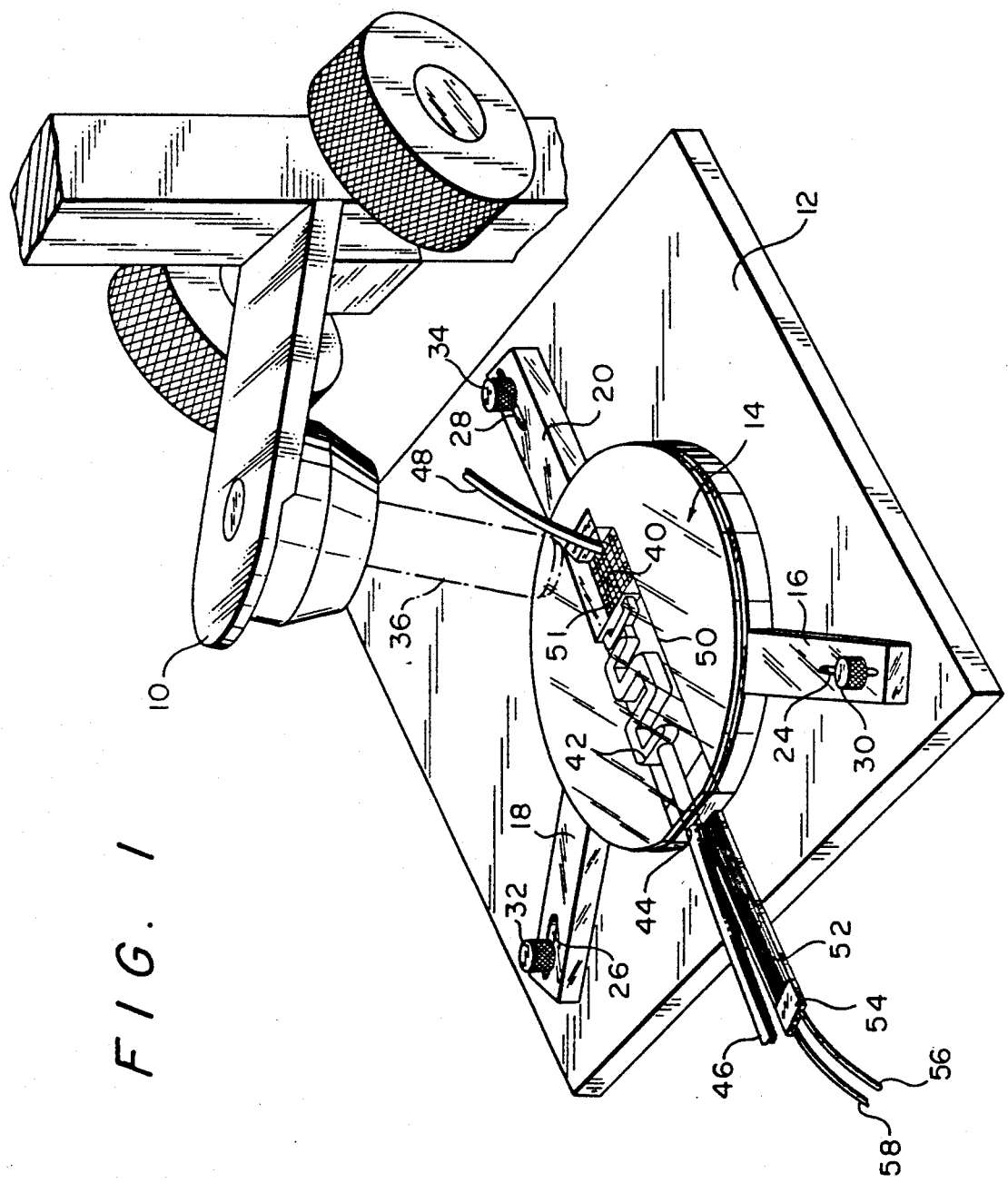
FIG. 1 is a perspective view of portions of a high magnification microscope utilizing a tissue recording chamber configured in accordance with the principles of the instant invention.

Referring now to FIG. 1, there is shown a high magnification microscope 10 having a stage 12 upon which a tissue recording chamber, designated generally by the numeral 14, is mounted. The tissue recording chamber 14 is retained in position on the stage 12 by three clamps 16, 18, and 20, which engage the periphery 22 thereof at positions preferably spaced 120° apart. The clamps 16, 18, and 20 each have slots 24, 26, and 28, respectively, therein and are secured to the stage 12 by knurled screws 30, 32, and 34. The clamps 16, 18, and 20 allow relatively precise positioning of the tissue recording chamber 14 with respect to the objective lens 36 (shown in phantom) of the microscope 10. As is seen in FIG. 1, the objective lens 36 must be brought into close proximity with the tissue sample or cell retained in the tissue recording chamber 14. Accordingly, the tissue recording chamber must have a relatively low profile so that one may properly focus the objective lens 36. Preferably, the tissue recording chamber 14 has a thickness of about ⅜" or about 1 cm and a diameter of approximately 4" or about 10.5 cm.

The tissue recording chamber 14 has a cavity 40 therein which contains the tissue sample or cell under scrutiny by the objective lens. The cavity 40 is in communication with a serpentine passageway 42 that has an inlet port 44 connected to an inlet line 46. Fluid from the inlet line 46 flows through the serpentine passageway 42 into the cavity 40, which is drained by an outlet line 48.

In order to keep constant the temperature of the liquid which forms a bath in the cavity 40, a microresistance heating element 50 having a grid of wires 51 is adhered to the bottom of the tissue recording chamber 14 in proximity with the cavity 50 and serpentine passageway 42. The heater 50 has leads 52 connected by a connector to a pair of power leads 56 and 58 that are connected to a DC power supply having an output in the range of 0–20 volts at 500 mA. A preferable heating element 50 is a heating element embedded within a clear mylar film having a thickness of 0.002" and an adhesive backing for adhering the heating element to the bottom of the tissue recording chamber 14. The heating element used in an operative embodiment of the invention is available from Minco, Inc., Model No. HS14415. The operative embodiment uses a Power Designs, Inc. power supply Model No. 6010 to provide current to the Minco, Inc. heating element.

Figure 2:
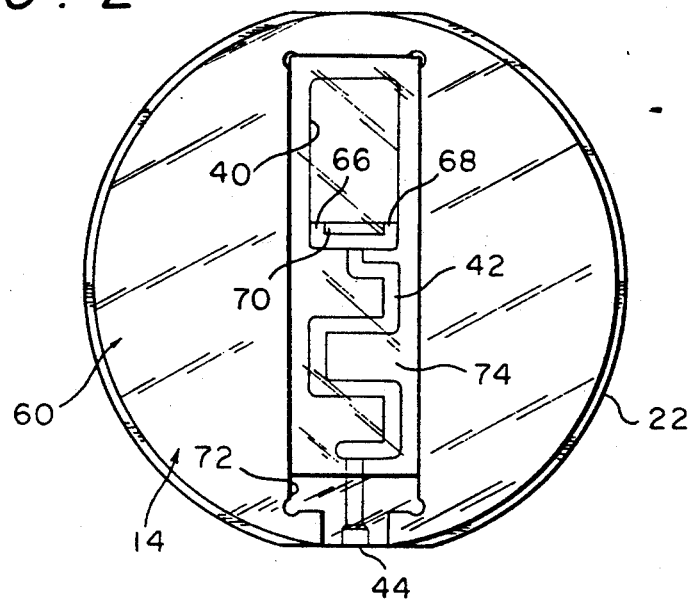
FIG. 2 is a bottom planar view of the tissue recording chamber of FIG. 1.
Figure 3:
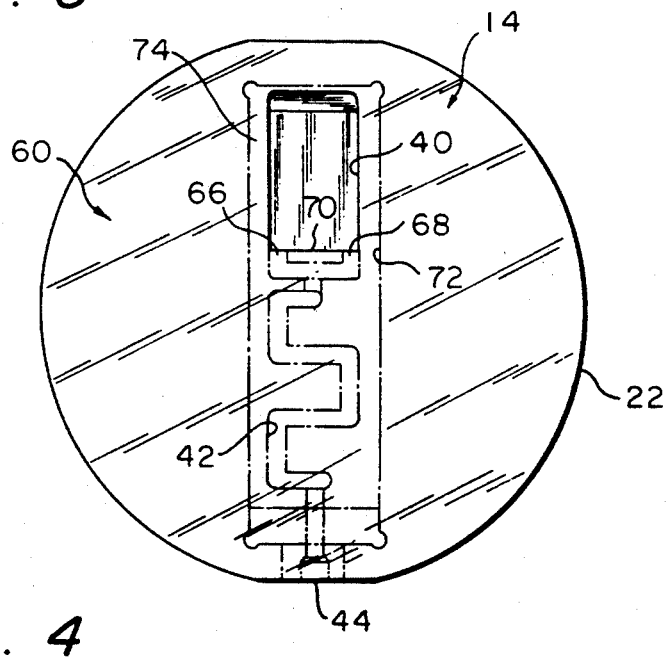
FIG. 3 is a top planar view of the tissue recording chamber of FIG. 1.
Figure 4:
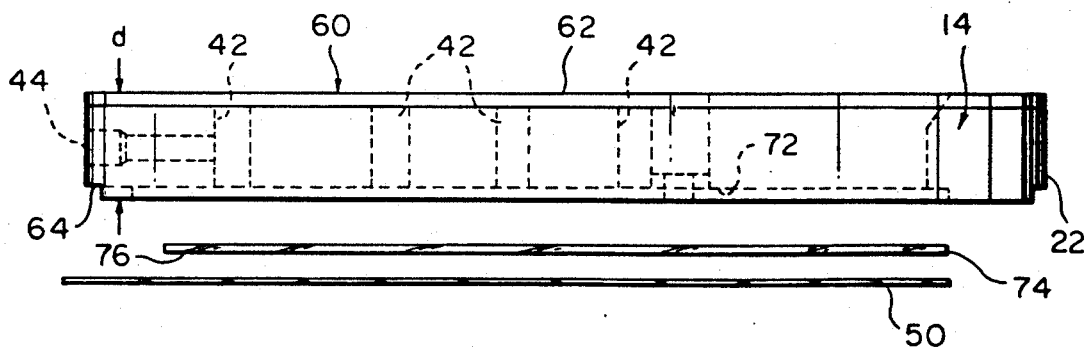
FIG. 4 is an exploded side view of the tissue chamber of FIGS. 2 and 3, with portions in phantom.

Referring now primarily to FIGS. 2, 3, and 4, where the tissue recording chamber 14 is shown in greater detail, it is seen that the tissue chamber is formed from a 4" blank of Lexan cylindrical stock sliced approximately ⅜" in diameter to form a base 60. The base 60 has the cavity 40 formed therein by cutting a rectangular hole 2 cm×4 cm completely through the base from the top side 62 to the bottom side 64 of the base. The serpentine passageway 42 is then cut into the base 60 through the bottom surface 64 of the blank. The port 44 in the blank 60 to which the inlet line 46 (FIG. 1) is connected is drilled radially through the periphery 22 of the blank 60 so as to communicate with the serpentine passageway 42. The serpentine passageway 42 communicates with the cavity 40 through openings 66 and 68, separated by a wall 70. By having openings 66 and 68 on opposite sides of the cavity 40, the liquid entering the cavity to form a bath for the tissue sample or cell therein flows around both sides of the tissue cell or sample, helping to provide uniformity of exposure to fresh liquid.

The bottom surface 64 has the cavity 40 cut clear through with the serpentine passageway 42 cut part way through. A rectangular recessed area 72 is formed in the bottom surface 64. The rectangular recessed area 72 is closed by a rectangular glass slide 74, which seats in the rectangular recessed area and is adhered to those portions 74 at the bottom of the recess through which the cavity 40 and serpentine passageway 42 are cut. The previously described heater 50 embedded in a rectangular mylar film strip is adhered to the bottom surface 76 of the glass slide 74 so as to heat liquid flowing in the inlet port 44, through the serpentine passageway 42, out the openings 66 and 68, and into the cavity 40. By making the passageway 42 serpentine, the length of time that liquid flowing therein is exposed to the heater so that the temperature of the liquid reaches and stabilizes at the temperature required of the liquid bath in the cavity 40.

The individual wires 51 in the heater 50 which form the wire grid define transparent windows therebetween having a combined area much greater than that of the wires, through which areas light readily passes. Any light blocked by the wires 51 is insignificant with respect to that transmitted by the transparent windows therebetween; so, for all practical purposes, tissue samples and cells within the cavity 40 are illuminated with an intensity no different from that which would be available in the absence of the wires. In addition, since the base 60 is made of transparent, or at least translucent, material, lateral illumination of the tissue sample and cells is accomplished. The cavity 40 is readily accessible to a temperature probe or any other instrument, which may simply be inserted proximate the top surface 62 of the tissue chamber 14.

The aforedescribed tissue recording chamber 14 is readily adaptable to and usable with standard high magnification microscopes 10, without interfering with the focus of the microscopes, while providing for proper illumination of the tissue or cells being observed, as well as providing ready access for treating and monitoring the tissue or cells being observed.

Without further elaboration, it is believed that one skilled in the art can, using the preceding description, utilize the present invention to its fullest extent. The previously described preferred specific embodiments are, therefore, to be construed as merely illustrative and not limitative of the remainder of the disclosure in any way whatsoever.

The entire disclosure of all applications, patents, and publications, cited above and below, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A tissue recording chamber useful when observing a sample of tissue or at least one cell with a microscope, the tissue recording chamber comprising:
    a base having an upper surface and a lower surface,
    a cavity within the base for retaining the sample,
    a transparent heater underlying the cavity for maintaining the temperature of the bath at a selected level while allowing light to illuminate the sample, and
    means for introducing a liquid into the cavity to form a bath therein for immersing the sample under observation wherein the means for introducing liquid into the cavity includes a serpentine passageway also in proximity with the heater through which the liquid flows, the serpentine passageway having an inlet and an outlet in communication with the cavity, whereby liquid which is not at the temperature of the bath at the inlet is raised to the temperature of the bath by the time the liquid emerges from the outlet.

2. The tissue recording chamber of claim 1, wherein the outlet of the serpentine passageway is at the periphery of the base, and the cavity is spaced from the inlet by a distance less than the distance of the serpentine passageway.

3. The tissue recording chamber of claim 2, wherein the base is circular.

4. The tissue recording chamber of claim 3, wherein the tissue recording chamber has a thickness between the upper and lower surfaces of approximately 1 cm.

5. The tissue recording chamber of claim 1, wherein the base is circular.

6. The tissue recording chamber of claim 1, wherein the chamber has a thickness between the upper and lower surfaces of approximately 1 cm.

7. The tissue recording chamber of claim 1, wherein the base is circular and wherein the cavity is spaced radially from the center of the base, with the inlet of the means for introducing liquid into the cavity being in the periphery of the base on the other side of the center.

8. The tissue recording chamber of claim 7, wherein the heater means comprises a grid of fine wires on a mylar substrate adhered on the bottom surface of the substrate in proximity with the cavity and in proximity with the means for introducing liquid to the cavity.

9. The tissue recording chamber of claim 8, wherein the base is made of a light-transmitting material.

10. In combination with a microscope having an objective lens and a stage beneath the objective lens, a tissue recording chamber having a cavity therein for containing a sample of tissue or at least one cell immersed in a liquid bath and being in alignment with the objective lens, the tissue recording chamber having a serpentine passageway therein through which liquid comprising the bath immersing the sample is supplied, the combination further including a transparent heater positioned beneath the serpentine passageway and the cavity for heating the liquid bath in which the sample is immersed and for raising the temperature of the liquid to that of the liquid bath as the liquid traverses the serpentine passageway and means for retaining the tissue recording chamber in a fixed position on the stage being in engagement with the periphery of the tissue recording chamber.

11. The combination of claim 10, wherein the tissue recording chamber is circular and wherein the retaining means comprise slidable clamping elements secured to the stage and radially adjustable with respect to the tissue recording chamber.

12. The combination of claim 10, further including means for draining liquid from the cavity so as to keep liquid circulating around the sample.

13. The combination of claim 10, wherein the tissue recording chamber has a thickness of approximately 1 cm and a diameter of approximately 10 cm.

14. In combination with a microscope having an objective lens and a stage beneath the objective lens, a tissue recording chamber having a thickness of approximately 1 cm and a diameter of approximately 10 cm, the recording chamber having a cavity therein for containing a sample of tissue or at least one cell and being in alignment with the objective lens, the tissue recording chamber further including a transparent heater positioned beneath the cavity for heating a liquid bath in which the sample is immersed and means for retaining the tissue recording chamber in a fixed position on the stage being in engagement with the periphery of the tissue recording chamber.

15. The combination of claim 14, wherein the tissue recording chamber is circular and wherein the retaining means comprise slidable clamping elements secured to the stage and radially adjustable with respect to the tissue recording chamber.

16. The combination of claim 15, wherein the tissue recording chamber further includes a passageway therein overlying the heater through which liquid comprising the liquid bath immersing the sample is supplied and wherein, as the liquid traverses the passageway, the temperature of the liquid is raised to that of the bath.

17. The combination of claim 16, further including means for draining liquid from the cavity so as to keep liquid circulating around the sample.

* * * * *